United States Patent Office 3,559,401
Patented Feb. 2, 1971

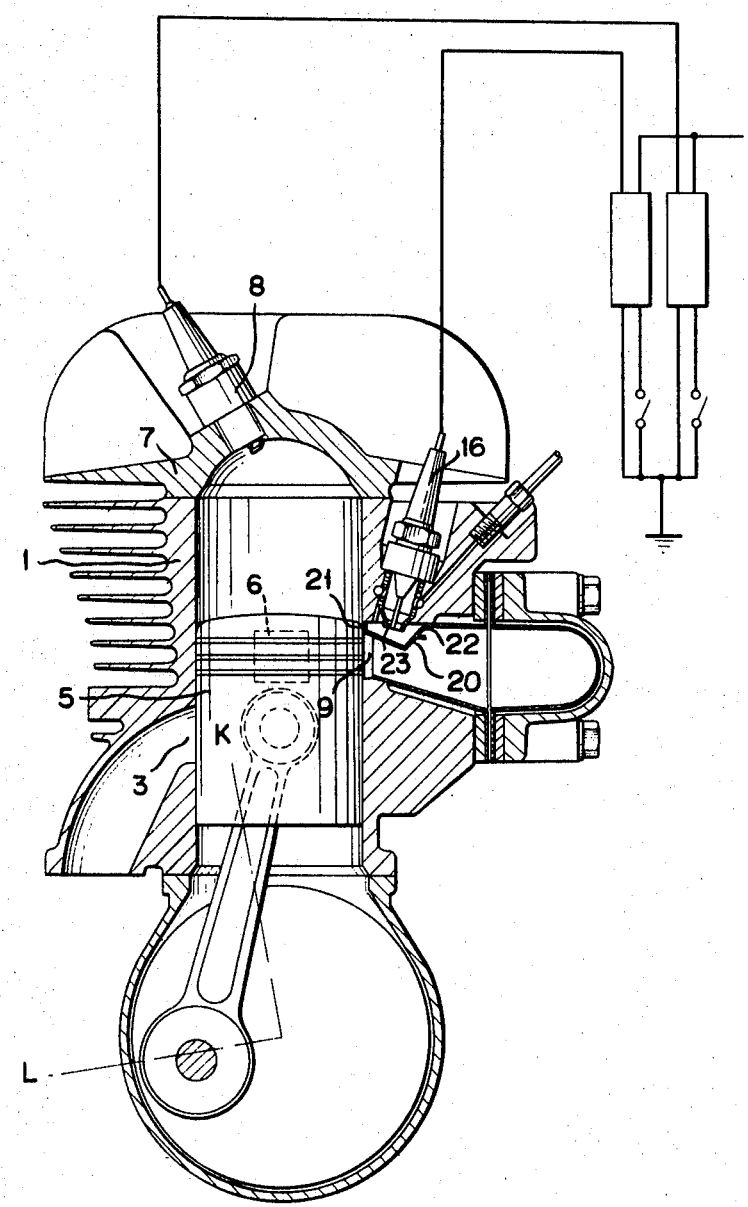

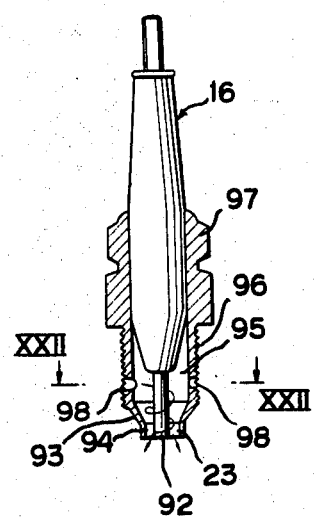
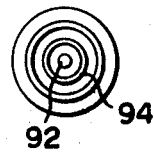
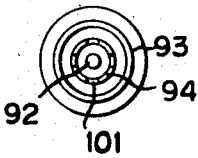
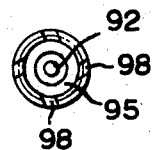
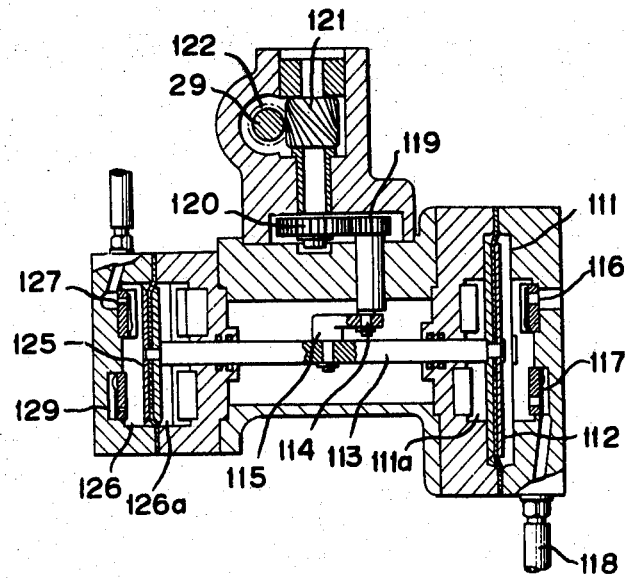

3,559,401
EXHAUST GAS CLEANING DEVICE FOR INTERNAL COMBUSTION ENGINES
Satoru Takahashi, Hamamatsu-shi, Japan, assignor to Suzuki Jidosha Kogyo Kabushiki Kaisha, Hamana-gun, Shizuoka-ken, Japan, a corporation of Japan
Original application June 12, 1968, Ser. No. 736,391. Divided and this application Sept. 15, 1969, Ser. No. 871,045
Int. Cl. F01n *3/14*
U.S. Cl. 60—30
9 Claims

ABSTRACT OF THE DISCLOSURE

A spark plug is caused to spark at a point in the exhaust passageway immediately downstream from the exhaust port of each cylinder of an engine immediately after full closure of the exhaust port during the compression stroke in order to cause combustion of some fuel-air gas unavoidably blown past the exhaust port in the exhaust passageway as charge-loss gas before full closure of the port. A small quantity of supplementary fuel-air gas can be supplied as pilot gas with or without supplemental air to the spark gap to facilitate and ensure positive ignition and combustion. Other refinements include a precombustion chamber around the spark gap and control devices for causing the pilot gas to be supplied only when this supply of pilot gas is advantageous.

---

This application is a division of my copending application, Ser. No. 736,391 filed June 12, 1968.

BACKGROUND OF THE INVENTION

This invention relates generally to the field of internal-combustion engines. More particularly, the invention concerns a device for causing combustion of combustible gas blown past the exhaust port (herein referred to as "charge-loss gas") particularly in a two-stroke-cycle (two-cycle) engine and in a four-stroke-cycle (four-cycle) engine in which the intake and exhaust values overlap (i.e., the intake valve opens prior to the full closure of the exhaust valve) and related devices.

In a two-cycle engine of general type without a blower, a gas mixture of fuel and air is formed in at least one carburetor and is drawn into the crankcase when the intake port is opened at a cycle point near the top dead center of the piston. This fuel-air mixture is herein referred to as "induction gas." (Throughout this disclosure a single cylinder-and-piston combination is considered unless otherwise specified.) The induction gas is subjected to primary compression by the descent of the piston. Then, as the piston approaches its bottom center, an exhaust port first opens, and the combustion gas resulting from combustion within the cylinder is partly discharged out of the exhaust port by the surplus energy of its own pressure.

Next, a scavenging port opens, and the induction gas which has been compressed within the crankcase enters the cylinder through the scavenging port. This gas in herein referred to as "scavenging gas." Upon entering the cylinder, the scavenging gas pushes the residual combustion gas out of the exhaust port. During this action, a part of the scavenging gas under surplus energy escapes past the exhaust port and is lost. This portion of the scavenging gas which is directly blown past the exhaust port without burning within the cylinder is herein referred to as "charge-loss-gas." (This term is herein considered preferable over the term "blow-by gas," which is used in some places, since the latter may be confused with blow-by meaning leakage of gas or liquid between the piston and cylinder and thence into the crankcase.)

In a four-cycle engine of high-speed type in which the intake valve is opened prior to the full closure of the exhaust valve, a portion of the intake mixture is short circuited as change-loss gas from the intake port to the outer side of the exhaust port similarly as in a two-cycle engine.

That is, as indicated in FIG. 1 (described hereinafter) of the accompanying drawings, the combustion gas resulting from combustion as represented by curve A is discharged at a high flowrate at the instant of opening of the exhaust port, and thereafter the exhaust flowrate decreases as the energy of this gas progressively diminishes. On the other hand, the unburned gas as represented by curve B initially is discharged merely as a gas composed of gasses which remain without burning in the combustion gas but, with the elapse of scavenging time, increases in flowrate as charge-loss gas is added thereto, this flowrate becoming a maximum immediately prior to the full closure of the exhaust port.

The unburned gas contains a large quantity of harmful constituents such as hydrocarbons, carbon monoxide, and oxides of nitrogen. Accordingly, in order to prevent their direct discharge into the atmosphere, after-burner type devices for burning this unburned gas in the exhaust pipe or muffler, for example, and air-injection devices have heretofore been used.

In an after-burner device, secondary air is added to and mixed well with the exhaust gas in order to assist combustion, and then the mixture is ignited. Consequently, the concentration of the combustible constituents of the exhaust gas becomes very low, and these constituents cannot be burned unless they are preheated to a substantially high temperature. For this reason, the device tends to become complicated and expensive. Furthermore, an after-burner device of this character cannot function immediately, requiring a considerable time for warming up after the engine is started. The greatest difficulty is the high temperature required for the treatment whereby harmful oxides of nitrogen are further produced as by-products.

An air-injection device is designed to inject air to cause combustion of the unburned component of the exhaust gas in the exhaust gas passageway while the exhaust gas is still hot immediately upon being discharged from the cylinder. This device, however, has had the disadvantage of not being capable of causing ignition and combustion of gases at low temperatures such as the above mentioned charge-loss gas.

I have found that the charge-loss gas immediately after being blown through the exhaust port and before becoming mixed with the combustion gas is substantially a body of fuel-air gas itself and can be readily combusted even at low temperatures and without supplementary air.

SUMMARY OF THE INVENTION

It is an object of the present invention to provide a device whereby the harmful component of the exhaust gas of internal combustion engines is reduced.

More specifically an object of the invention is to provide a device whereby the above described charge-loss gas is intercepted at a point immediately downstream from the exhaust port and caused to ignite and burn thereby to reduce the content of the harmful component in the exhaust gas.

According to the present invention, briefly summarised, there is provided an exhaust gas cleaning device in an internal combustion engine, which device is characterized by the combination of a spark plug having a spark gap disposed in the exhaust gas outlet passageway of each engine cylinder at a point immediately downstream from the exhaust port and ignition means to cause the spark plug to spark immediately after full closure of the exhaust port during the compression stroke of that cylinder thereby to ignite and combust charge-loss gas.

In one embodiment of the invention, a precombustion chamber is provided around the spark gap of the above described spark plug to facilitate ignition of the charge-loss gas.

In another embodiment of the invention, a small quantity of fuel-air gas is supplied as pilot gas to the spark gap of the above described spark plug to cause precombustion whereby an inductive flame is produced thereby to induce secondary ignition and combustion of the charge-loss gas in a positive manner.

In still another embodiment of the invention, air is supplementarily supplied to the region around the above mentioned spark gap thereby to facilitate combustion of the charge-loss gas and, moreover, to suppress the formation of hydrocarbons and carbon monoxide.

In a further embodiment of the invention, control means are provided to operate in response to an operational condition of the engine to control the above mentioned supply of pilot gas, stopping this supply when the pilot gas would be wasted and permitting this supply only when it is advantageous.

The present invention, in a further aspect thereof, provides a spark plug for the above described purpose of a construction which is highly suitable and advantageous for achieving the objects of the invention.

The nature, principle, details, and utility of the invention will be more clearly apparent from the following detailed description with respect to preferred embodiments of the invention, when read in conjunction with the accompanying drawings, in which like parts are designated by like reference numerals and characters.

BRIEF DESCRIPTION OF THE DRAWINGS

In the drawings:

FIG. 3 is a combination of views similar to FIG. 2 showing another embodiment of the invention as applied to a two-cycle engine;

FIG. 19 is a longitudinal section of a spark plug suitable for use in the device of the invention;

FIG. 20 is a bottom view of the spark plug shown in FIG. 19;

FIG. 21 is a bottom view of another configuration of the spark plug;

FIG. 22 is a cross sectional view taken along the plane indicated by line XXII—XXII in FIG. 19 and viewed in the arrow direction;

FIG. 24 is a sectional view taken along the plane indicated by line XXIV—XXIV in FIG. 23 and viewed in the arrow direction.

DETAILED DESCRIPTION

Figure 1:
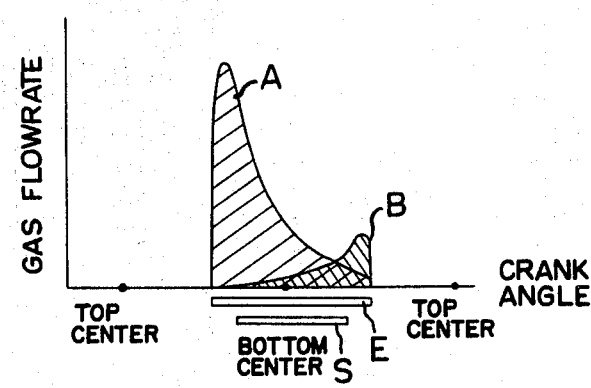
FIG. 1 is a graphical representation indicating the flowrates of the combustion gas and unburned gas within the exhaust gas as measured at the exhaust port of a two-cycle engine for various crank angles during the operation of the engine.

As described briefly hereinbefore, FIG. 1 shows curves obtained from measured values relating to the exhaust gas of a two-cycle engine, the abscissa representing the crank angle and the ordinate representing gas flowrate. Interval S indicates the crank-angle interval in which the scavenging port is open, while interval E indicates that in which the exhaust port is open. The area below curve A represents the quantity of combustion gases contained in the exhaust gas, and the area below curve B represents the quantity of unburned gas.

Figure 2:
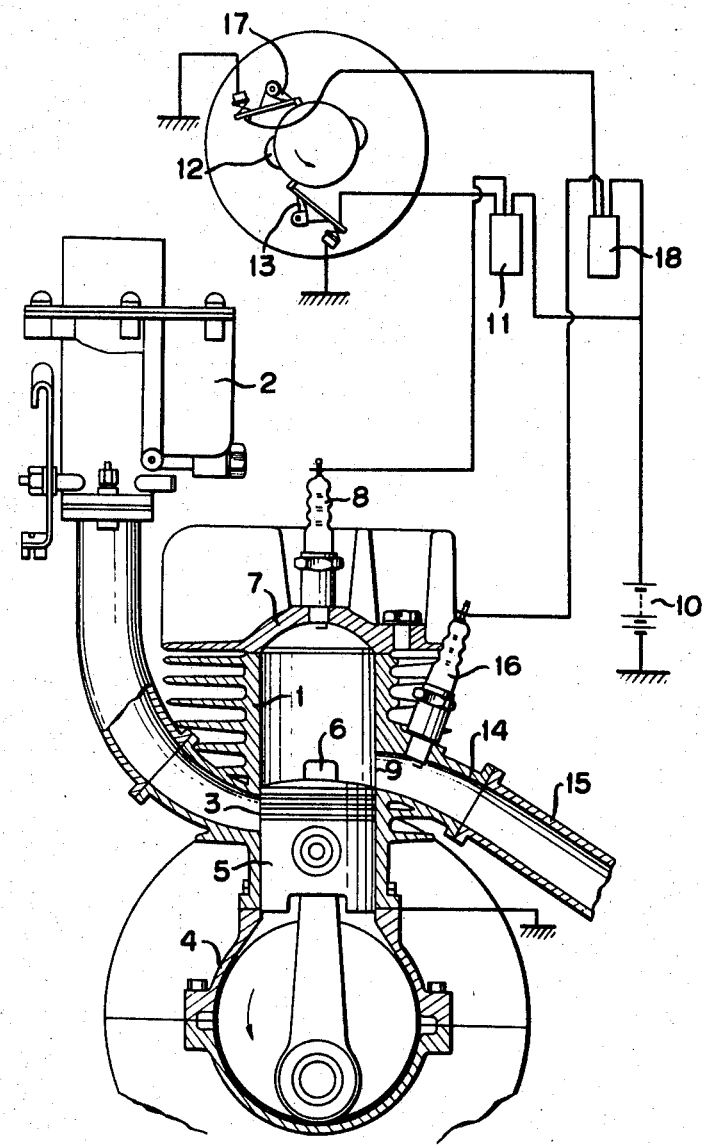
FIG. 2 is a combination of an elevational view, partly in vertical section, and a schematic diagram showing one embodiment of the invention.

In one embodiment of the invention as illustrated in FIG. 2, the device of the invention is installed in a two-cycle engine having a cylinder 1, a carburetor 2, an intake port 3, a crankcase 4, a piston 5, a scavenging port 6, a cylinder head 7, an exhaust port 9, an exhaust-gas outlet fitting 14 contiguously connected to the outer side of the exhaust port 9 of the cylinder 1 and constituting an exhaust outlet passageway, and an exhaust pipe 15 connected to the outer end of the outlet fitting 14.

The engine further has an electrical ignition system comprising a battery 10, a first ignition (induction) coil 11, a distributor having a rotating cam 12 inter-coupled with the engine crankshaft and a first contact breaker 13, and a first spark plug 8 installed in the cylinder head 7 for igniting scavenging gas within the cylinder, the ignition timing of the first spark plug 8 being determined by the first contact breaker 13.

In this engine of generally conventional organization as described above, there is provided the device of the invention which comprises a second spark plug 16 installed in the side wall of the outlet fitting 14 in a position close to the exhaust port 9, a second contact breaker 17 in the same distributor as the first contact breaker 13, and a second ignition coil 18 activated by the operation of the second contact breaker 17 to supply ignition current to the second spark plug 16.

The ignition timing of the spark plug 16 as determined by the contact breaker 17 is set to be close to a timing point immediately prior to the full closure of the exhaust port since the flowrate of the charge-loss gas past the exhaust port is a maximum at this timing point as mentioned hereinbefore with reference to FIG. 1. However, it is desirable that this ignition timing coincide with a point immediately after the full closure of the exhaust port since an ignition timing prior to the full closure gives rise to the possibility of deleterious effects such as preignition (or premature ignition) of the gas within the cylinder 1.

The results of my experiments indicate that maximum combustion of the charge-loss gas occurs in an interval up to 40 degrees in terms of the crank angle after full closure of the exhaust port 9 and that any further delay in ignition of this gas results in difficulty in combustion thereof because of progressive admixing of this gas with the combustion gas.

While, the quantity of hydrocarbons discharged in the exhaust gas of an internal combustion engine varies somewhat with factors such as the size of the engine, the state of adjustment of the carburetor, and the operational conditions, it is from 4,000 to 5,000 p.p.m., in general. I have found, however, that by using the device of the invention to cause combustion of the charge-loss gas, this quantity of discharged hydrocarbons can be reduced to from 300 to 500 p.p.m.

In the method for combustion of the charge-loss gas according to the preceding example of the invention, the scavenging gas pressure becomes low when the throttle opening is small and the flowrate of the induction gas is low as in the case of idling and so-called engine braking in a motor vehicle, and the charge-loss gas mixes with the residual gases within the cylinder. Consequently, the fuel content of the charge-loss gas itself becomes diluted, and it becomes difficult to ignite the resulting mixture by means of a spark produced by the spark plug 16.

Figure 7:
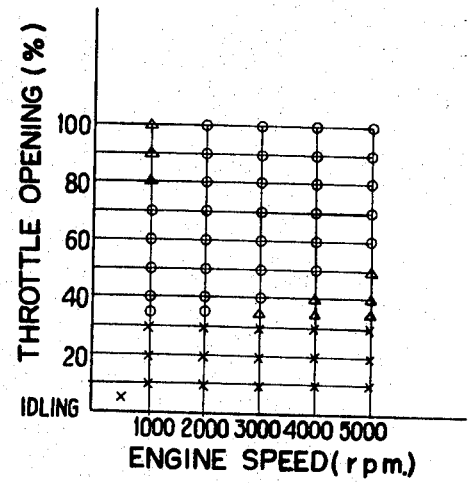
FIG. 7 is a graphical representation of the relationship between throttle opening and engine speed indicating the state of combustion of a charge-loss gas combustion device of known type.

More specifically, it has been found by actual measurement that, as indicated in FIG. 7, combustion cannot be achieved (X mark) with a throttle opening of 30 percent or smaller degree, and when the engine speed is high, the combustion is unstable (Δ mark) even with a throttle opening of 50 percent.

By close examination of the behavior of the charge-loss gas on the inner and outer sides of the exhaust port, I have found that the reason for this combustion difficulty is that the charge-loss gas not only is blown out by the energy of the scavenging gas as described hereinbefore but also undergoes a characteristic outflow motion as described below and indicated in FIG. 4 in the interval from the closing of the scavenging port by the piston ascending from its bottom dead center to the closing of the exhaust port by the piston, and this motion inhibits ignition of the charge-loss gas when the flowrate of the induction gas is low.

Figure 4A:
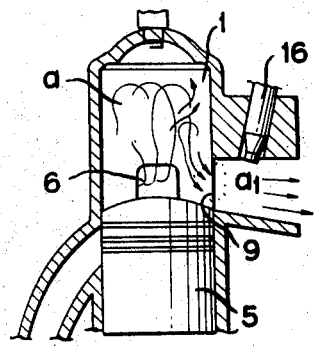
FIGS. 4(a), 4(b), and 4(c) are diagrammatic elevational views, in vertical section, indicating the states of discharge of charge-loss gas as the exhaust port of a two-cycle engine is progressively closed by the rising piston.
Figure 4B:
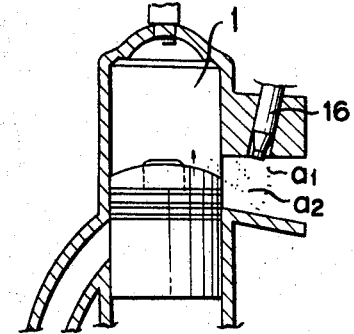

FIG. 4(a) indicates the operational state wherein the piston 5 is in the vicinity of the bottom center, the inrushing motion of the scavenging gas $a$ has just stopped and the charge-loss gas $a_1$ is temporarily in a stagnant state immediately outside of the exhaust port 9. As the piston rises as indicated in FIG. 4(b), the volume of the space within the cylinder 1 is reduced, and the scavenging gas in the cylinder begins to be forced out through the exhaust port, the scavenging gas thus forced out being designated by reference character $a_2$. At the same time, the above mentioned charge-loss gas $a_1$ is pushed outward.

Figure 4C:
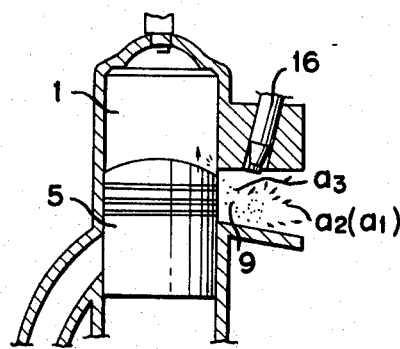

Then, as the piston ascends further to close the scavenging port 6 and reaches a position immediately before that of full closure of the exhaust port, as indicated in FIG. 4(c), the pressure within the cylinder is thereby increased, and the scavenging gas being forced out is ejected out in the form of a jet since the exit orifice at the exhaust port 9 is now a slit. The direction of this gas jet $a_3$ is almost vertically downward from the upper lip of the exhaust port, and the gas jet collides with the bottom of the exhaust outlet passageway and is deflected as a turbulent flow. This turbulent flow agitates the aforementioned charge-loss gas $a_1$ and $a_2$ existing in the outlet passageway, whereby unburned gas diffuses throughout the combustion gas.

The spark plug 16 must spark immediately after the exhaust port 9 is fully closed in order to prevent preignition of the fuel-air mixture within the cylinder, as mentioned hereinbefore, but at this time, the gas ejected in the form of a jet has already diffused in the combustion gas. Consequently, when the induction gas flowrate is low and the flowrate of the charge-loss gas is low, the ignition spark is incapable of positively intercepting and igniting the charge-loss gas. As a result, as I have discovered, the range of throttle openings at which combustion does not occur is widened at low flowrates of the induction gas.

However, I have found further that the flowrate of the jet gas $a_3$ in actual practice is the highest of the flowrates of the charge-loss gas in various states $a_1$, $a_2$, and $a_3$ and that, by conducting this unburned gas $a_3$ with good timing to the spark of the spark plug 16 without causing its diffusion, it is possible to obtain full combustion of this gas even during operation at a low flowrate of the induction gas.

The present invention, in one aspect thereof, is based on this discovery and provides a practical exhaust gas cleaning device in which conditions for facilitating ignition of the charge-loss gas are afforded by a special organization of the exhaust outlet passageway, whereby combustion of the charge-loss gas, that is, cleaning of the exhaust gas, which heretofore was not possible at low flowrates of the induction gas, is made possible.

Figure 5:
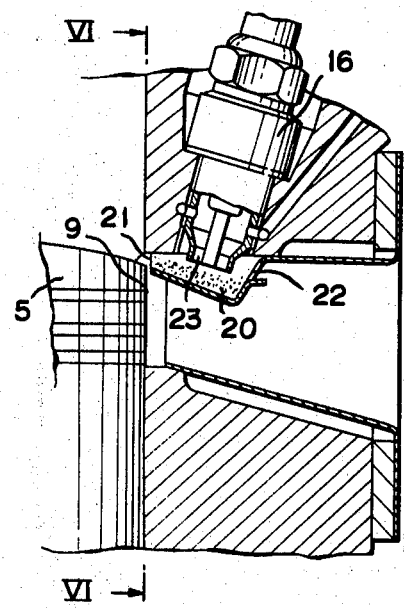
FIG. 5 is an enlarged fragmentary view, partly in vertical section, showing essential parts and installation thereof of the device of FIG. 3.
Figure 6:
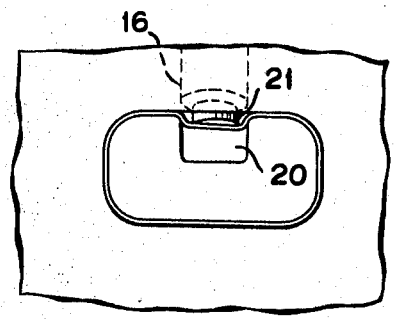
FIG. 6 is a fragmentary elevational view of the cylinder surface indicated by line VI—VI in FIG. 5 in the arrow direction.

In one example of practice of the invention as shown in FIGS. 3, 5, and 6, an ignition chamber 20 is provided in the upper wall or ceiling of the exhaust outlet passageway immediately downstream from the exhaust port 9. This ignition chamber 20 has an inlet 21 positioned in the vicinity of the upper lip of the exhaust port 9 and having a narrow opening and has an outlet 22 downstream from the spark plug 16. The spark gap end of the spark plug 16 is disposed in and exposed to the interior of this ignition chamber 20.

The ignition timing is set to be immediately after full closure of the exhaust port 9 and corresponds to position L in terms of crank angle as indicated in FIG. 3.

The device of the above described organization according to the invention operates in the following manner. The piston 5 descends from top center to bottom center, and normal operation from combustion of the induction gas, through exhausting, to scavenging is carried out. Then, immediately prior to full closure of the exhaust port 9 by the piston 5, charge-loss gas is ejected as a jet at high velocity through the exhaust port, which is now a slit.

Since the inlet 21 of the ignition chamber 20 is positioned to confront this slit opening of the exhaust port 9 immediately downstream therefrom, the gas jet ejected through the slit opening is conducted directly into the chamber interior and, upon being deflected by the bottom floor of the chamber 20, becomes a turbulent flow. The gas thus entering the ignition chamber 20 fills the chamber and, at the same time, is blown into the region around the spark gap 23 of the spark plug 16. The spark of the spark plug 16 is produced at this instant to cause ignition and combustion of this unburned gas. The resulting combustion flame then travels through the inlet 21 and outlet 22 of the ignition chamber into the exhaust outlet passageway to induce secondary combustion of the charge-loss gas existing in a stagnant state in the passageway.

In an actual instance of testing of a device of the above described organization, an ion plug was inserted into the exhaust outlet passageway, and the occurrence or nonoccurrence of combustion in the passageway was determined from the resulting ionic waveforms for various values of throttle opening and engine speed. The results of this test are indicated in FIG. 8, in which a circle, O, indicates combustion, a cross, X, indicates no combustion, and a triangle, Δ, indicates an unstable case wherein combustion irregularly occurred at certain times and did not occur at other times.

Figure 8:
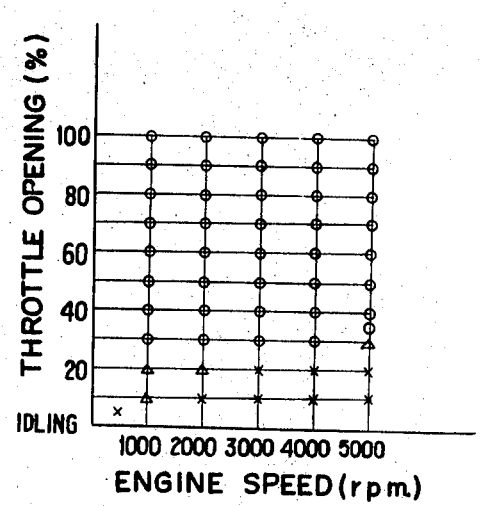
FIG. 8 is a representation similar to FIG. 7 for an example of the device of the invention.

It can be observed from FIG. 8 that satisfactory ignition and combustion can be attained even with a throttle opening of 30 percent and that ignition is possible even with a throttle opening of 10 percent at an engine speed of 1,000 r.p.m. although the combustion is unstable. Thus, these results may be considered to indicate clearly the effectiveness of the device of the invention in causing combustion of the charge-loss gas even at a low flowrate of the induction gas as compared with case indicated in FIG. 7.

The effectiveness in ignition of the charge-loss gas by the above described example of practice of the invention can be further increased by still another embodiment of the invention as described below and illustrated in FIGS. 9 through 22.

According to this embodiment of the invention, a small quantity of unburned fuel gas from a separate region is conducted to the spark gap of the spark plug 16 to cause this gas to ignite and burn, and the flame resulting from this combustion is used to cause ignition and combustion of the charge-loss gas in a secondary manner. By this technique, it is possible to cause ignition by a function which is completely different from that of an electrical spark because the flame has a preheating effect to some extent with respect to dilute unburned fuel gas and because the ignition area is large. Furthermore, it is possible to cause positive interception of the charge-loss gas which exists in an irregular state in the exhaust outlet passageway at the advancing front of the spreading flame.

Figure 18:
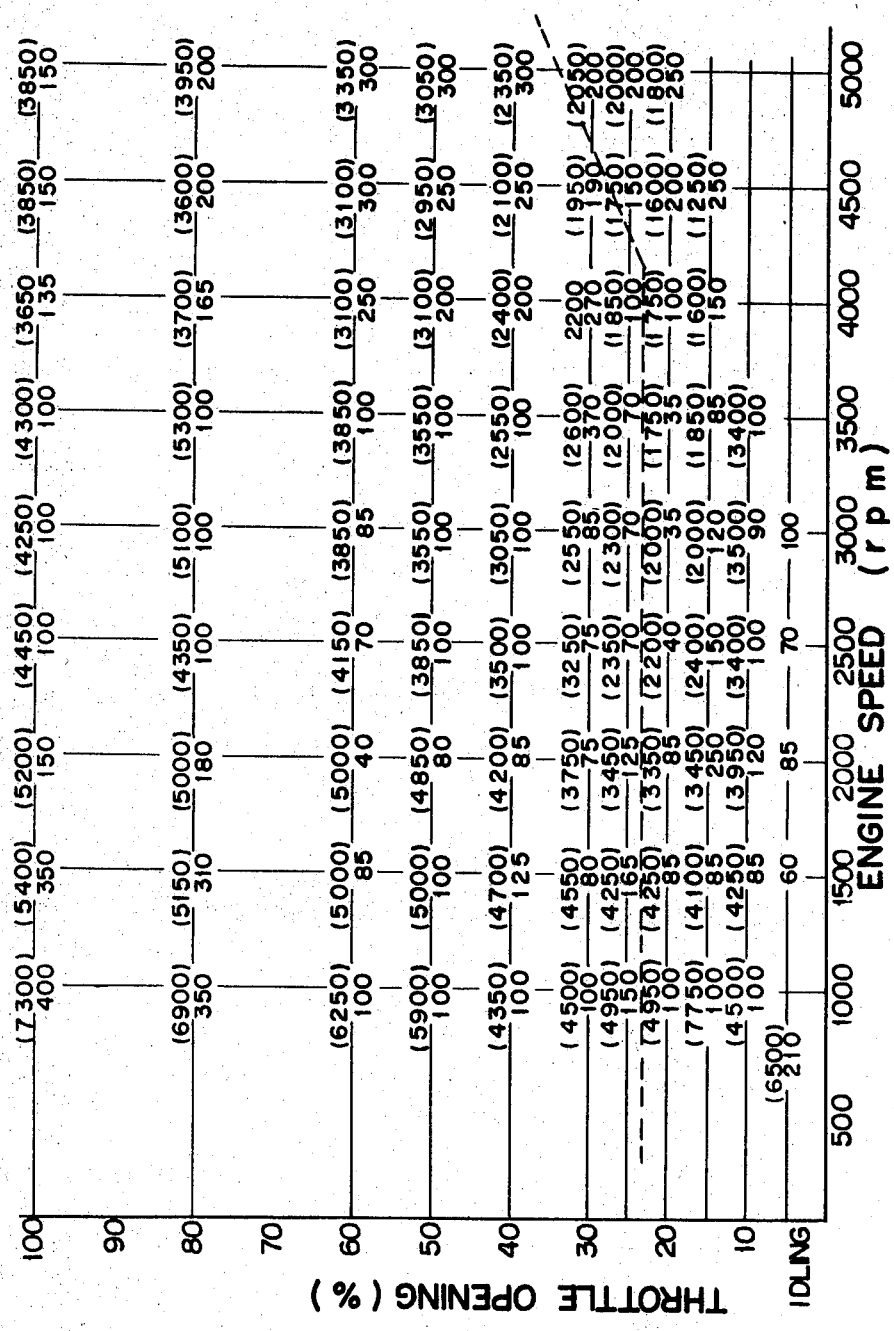
FIG. 18 is a representation similar to FIG. 17 but with measured numerical values of hydrocarbon content (p.p.m.) in the exhaust gas, indicating the effectiveness of the device of the invention.

According to the results of experiments, excellent results were obtained through the use of a device constituting one example of this embodiment of the invention as indicated by FIG. 18 showing hydrocarbon contents (p.p.m.). In FIG. 18, the values in parentheses ( ) are those for the case wherein an exhaust gas cleaning device was not installed and are shown for comparative purpose. These measured results clearly verify the effectiveness of the device in cleaning the exhaust gas at various engine speeds.

A specific example of organization according to the embodiment of the invention briefly described above will now be described in detail with reference to FIGS. 9 through 22.

Figure 9:
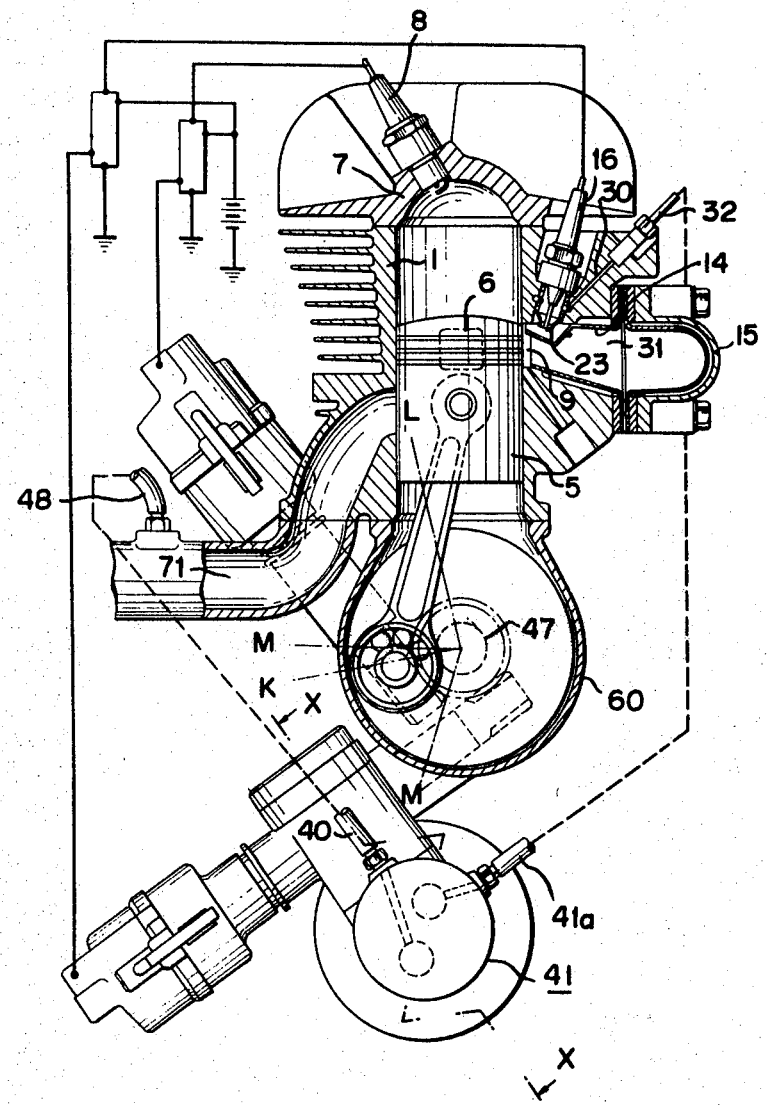
FIG. 9 is a combination of views similar to FIG. 2 showing still another embodiment of the invention as applied to a two-cycle engine.

As shown in FIG. 9, a fuel-air gas supply passage hole 30 is provided in the vicinity of the spark plug 16 and has an outlet opening into the exhaust passageway 31 and directed toward the spark gap 23 of the spark plug 16. This passage hole is connected at its inlet end to a supply pipe 32.

By this provision, a small quantity of unburned fuel-air gas (hereinafter referred to as "pilot gas") is delivered to the spark gap 23 prior to ignition and undergoes combustion upon being ignited by a spark at the spark gap. This combustion is independent of and unaffected by the flowrate and fuel concentration of the aforementioned charge-loss gas. The charge-loss gas is then ignited by the combustion flame of the pilot gas and undergoes combustion in a secondary manner.

When the induction gas flowrate is low and the charge-loss gas flowrate is low, the charge-loss gas may be considered to become a dilute mixture gas because of mixing with the combustion gas as mentioned hereinbefore. However, even in such an excessively dilute mixture gas, the fuel-air ratio never drops below the minimum limit (approximately 1/20) of combustibility of gasoline at normal pressure. Therefore, if positively ignited, this dilute mixture gas can undergo combustion.

The ignition action of an ignition spark, however, is such that, although ignition is accomplished in the extremely small region through which the spark travels, the resulting flame nucleus of combustion becomes cool before it can grow into a flame having the capability of propagating spontaneously. Consequently, flame propagation does not occur, and ignition of the entire body of gas is impossible in almost all cases.

In contrast, an ignition flame, such as that provided in the above described manner according to the invention, has a high preheating effect and a high flame propagation capability whereby there is no ignition failure. Furthermore, when the induction gas flowrate is low and amount of the charge loss gas is small, the charge-loss gas exists in a divisionally scattered state together with the combustion gas in many cases, rather than in the theoretical diluted state as mentioned above. For this reason, the probability of ignition of this charge-loss gas by a small ignition spark is low, but with an ignition flame, positive ignition can be attained by the spreading flame front.

Accordingly, there is no necessity for combustion at high temperatures such as to generate oxides of nitrogen. It is, therefore, a feature of the device of the invention that it can clean the exhaust gas of an internal combustion without increasing the oxides of nitrogen.

An example of results obtained by supplying and burning pilot gas and causing combustion in a secondary manner of charge-loss gas as described above is indicated in FIG. 18. From these results it is apparent that, even in the range of low induction gas flowrates (i.e., below the intermittent line), the hydrocarbon contents are substantially reduced in comparison with the hydrocarbon contents, as shown within parentheses, ( ), in the case wherein the charge-loss gas is not burned.

Figure 10:
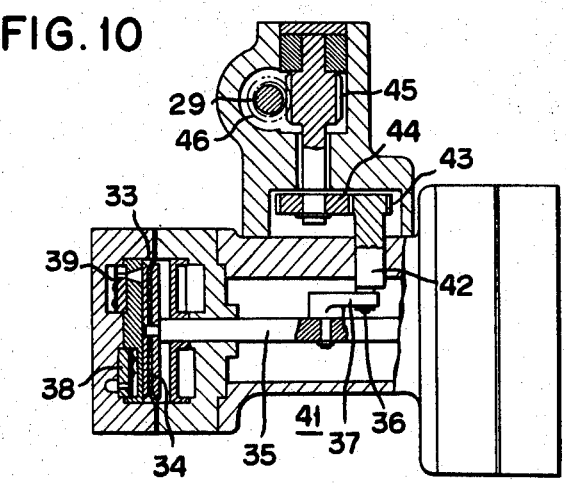
FIG. 10 is a sectional view taken along the bent surface indicated by line X—X in FIG. 9 and viewed in the arrow direction.

One example of a device for supplying pilot gas through the aforementioned supply pipe 32 to the supply passage hole 30 is a pumping device 41 as illustrated in FIGS. 9 and 10. This pumping device 41 has a pump chamber 33, a diaphragm piston 34 disposed across the pump chamber, and a piston rod 35 fixed at one end thereof to the center of the diaphragm piston and coupled at an intermediate part by a connecting rod 37 to a small crank 36. The piston rod 35 can thereby be driven to undergo oscillatory motion of small stroke whereby the diaphragm piston 34 is caused to undergo reciprocating motion. The pump chamber 33 thus carries out pumping action of aspiration and discharge.

The pump chamber is provided with a suction valve 38 and a discharge valve 39 with ports connected respectively to a suction pipe 40 and a discharge pipe 41a connected to the supply pipe 32. The suction pipe 40 is connected to a branch fitting 48 opening into the engine intake passageway as shown in FIG. 9. Alternatively, the suction pipe 40 can be connected to a miniature carburetor.

The aforementioned small crank 36 has a shaft 42 intercoupled through intermeshed gears 43 and 44 and gears 45 and 46 to the cam shaft 29 of the distributor. The gear ratios are so selected that one revolution of the engine crankshaft 47 causes the pumping device 41 to undergo one reciprocating cycle of pumping action. The timing of this action is so set that the effective discharge stroke, as indicated by crank angle M—M in FIG. 9, covers and includes the spark timing K of the spark plug 16.

Thus, a small quantity of pilot gas is supplied to the spark gap 23 of the spark plug 16 prior to the sparking thereof for each operational cycle.

Figure 11:
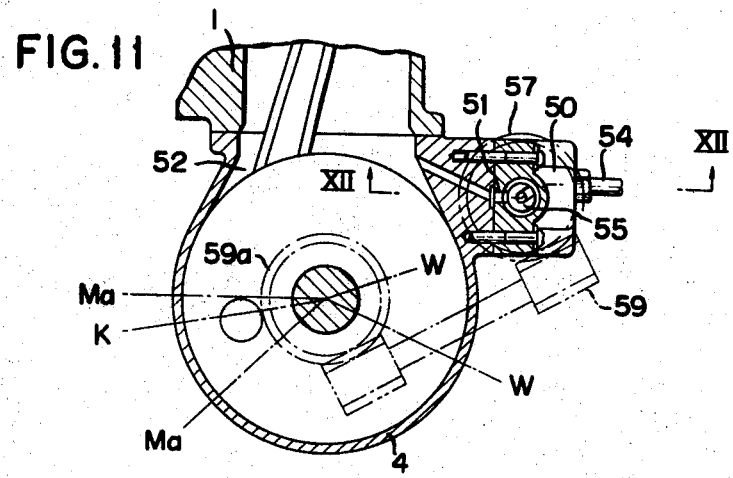
FIG. 11 is an elevational view, in vertical section, of a two-cycle engine crankcase provided with a device for conducting out pilot gas.
Figure 12:
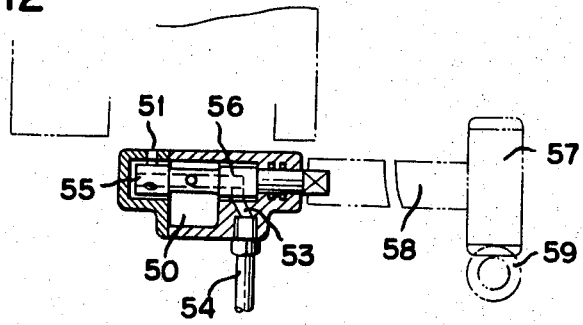
FIG. 12 is sectional view taken along the bent surface indicated by line XII—XII in FIG. 11.

In another example of a device for supplying pilot gas as illustrated in FIGS. 11 and 12, a special method is resorted to. The device has a pressure chamber 50 with an inlet 51 communicating with the interior of the crank-case 52 and an outlet 53 communicating with a lead-out pipe 54 connected to the pilot gas supply pipe 32 (shown in FIG. 9). Rotary valves 55 and 56 are provided to open and close the inlet 51 and outlet 53, respectively, and are integrally and coaxially formed, being driven through a gear 57 and a shaft 58. The gear 57 is driven in turn by the engine crankshaft through a gear 59a fixed thereto and an intermediate gear 59, whereby the rotary valves 55 and 56 are rotated with a rotational speed ratio of 1:1 with respect to the engine crankshaft.

The interval during which the inlet 51 is opened by one revolution of the rotary valve 55 corresponds to the interval in which the piston descends from top center and opens the scavenging port 6 (i.e., the crank angle W—W in FIG. 11). The interval during which the outlet 53 is opened by the rotary valve 56 occurs in a suitable crank advance angle of Ma—Ma which includes the ignition timing K of the aforementioned spark plug 16.

That is, the induction gas drawn into the crankcase 52 is compressed by the descent of the piston, and a portion of this compressed gas, entering through the inlet 51, fills the pressure chamber 50. Then, prior to the opening of the scavenging port 6, the inlet 51 is closed, and the compressed gas is thereby locked in within the pressure chamber 50. Then, prior to the sparking of the spark plug 16, the outlet 53 is opened, and the compressed gas which has been locked in is released to flow through the lead-out pipe 54 and pilot gas supply passage hole 30 and is thereby supplied to the spark gap 23 of the spark plug 16.

In a modification of the device, the rotary valve 56 of the outlet 53 is omitted, and the timing of release of the compressed pilot gas is caused to be within the aforementioned angle range Ma—Ma by appropriate selection of design values such as the volume of the space within the pressure chamber and the inner diameter and length of the lead-out pipe 54.

Figure 13:
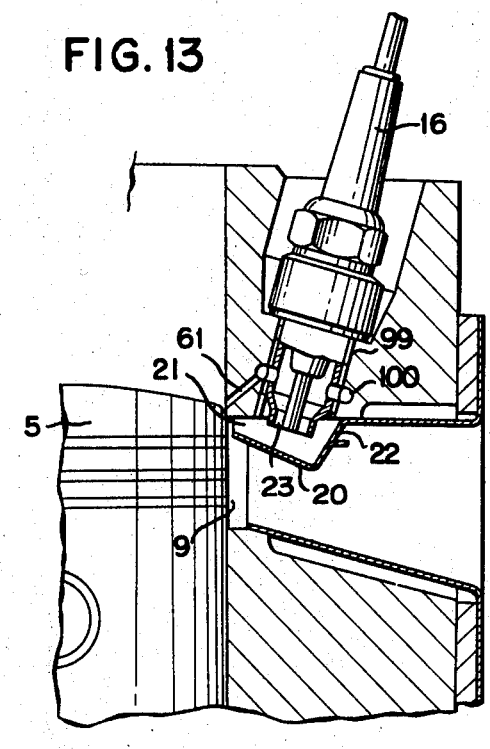
FIG. 13 is an enlarged fragmentary view, partly in vertical section, showing a part of the cylinder of a two-cycle engine provided with a device for conducting pilot gas out of the combustion chamber.

In still another example of means for supplying pilot gas, as illustrated in FIG. 13, a pilot gas supply passage hole 61 is formed in the cylinder wall of a two-cycle engine with an inlet opening positioned directly in the inner wall surface of the cylinder slightly above the upper rim of the exhaust port 9. The outlet opening of the passage hole 61 is positioned to supply pilot gas to the spark gap 23 of the spark plug 16 as described hereinafter.

As the piston 5 ascends, and the fuel-air gas within the cylinder is compressed, particularly as the exhaust port opening becomes small and is closed, the pressure within the cylinder increases, and compressed gas is forced through the passage hole 61. However, since this passage hole 61 is then immediately closed by the upper part of the piston 5, only a small quantity of pilot gas is thus sent therethrough. This pilot gas is positively fed to the spark gap 23 and burns upon being ignited by a spark.

While it may appear logical that the sparking of the spark plug 16 should be timed to occur immediately after closure of the inlet opening of the passage hole 61, even when the said hole 61 is yet in opening state immediately after full closure of the exhaust port 9, ignition occurs at the leading front part of the exhausted combustion gas, whereby combustion continues in the form of a flame conforming to the jet of combustion gas. Therefore, by appropriately selecting the length and diameter of the passage hole 61 with careful consideration of the velocity of flame propagation, it is possible to set this spark timing at the optimum instant for ignition and combustion of the charge-loss gas without any possibility of the flame entering the engine cylinder.

In a modification of the above described means for producing an ignition flame, a cutout recess is formed in the upper lip of the exhaust port and the upper part contiguous thereto of the exhaust outlet passageway instead of using a separate passage hole 61 for pilot gas supply, and the spark gap 23 of the spark plug 16 is positioned in this recess so that the unburned fuel-air gas injected through this recess is blown toward the spark gap.

Figure 17:
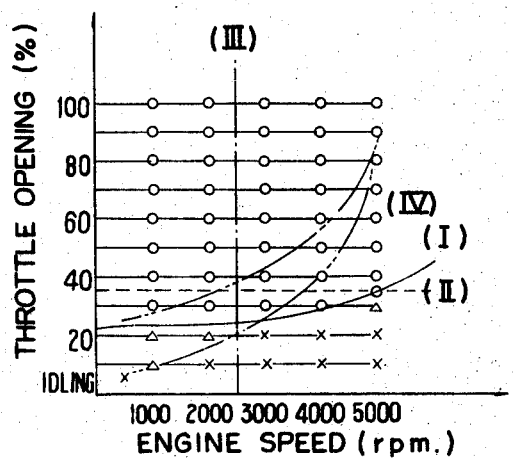
FIG. 17 is a representation similar to FIGS. 7 and 8 indicating the state of exhaust gas cleaning in an engine not provided with the device of the invention.

The results of an actual instance of practice in which the charge-loss gas was burned without the use of pilot gas are indicated in FIG. 17, from which it is apparent that ignition and combustion were obtained positively when the throttle opening was large. In FIG. 17, a circle mark, O, designates a combustion region, a triangle mark, Δ, designates an uncertain combustion region, and a cross mark, X, designates a non-combustion region (these terms being used hereinafter in conformance with FIG. 17).

Supplying of pilot gas to cause combustion thereof under conditions corresponding to the combustion region results merely in a waste of fuel and a useless rise in temperature of the exhaust outlet passageway and, therefore, is meaningless and wasteful. Accordingly, by deterring the uncertain combustion region and the non-combustion region and providing means for controlling the pilot gas supply so that pilot gas is fed only in these regions, it is possible to eliminate the above described waste and to provide an exhaust cleaning device according to the invention which is efficient and completely satisfactory. Such control means can be practically provided in the following manner.

Figure 14:
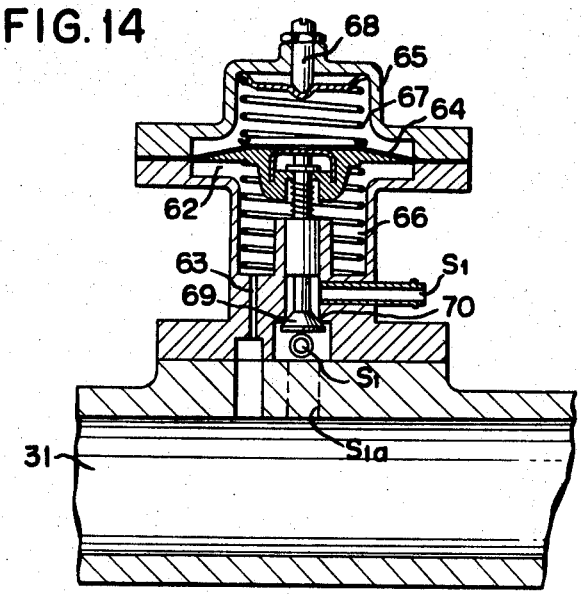
FIG. 14 is an enlarged view, in longitudinal section, of a valve for control by vacuum of supply of pilot gas.

In one example of a device for controlling pilot gas supply as illustrated in FIG. 14, the control device is mounted on the outer side of the engine fuel-air intake passageway 31 and has a negative pressure chamber 62 communicating with the passageway 31 through a passage 63 having a constricted part. A diaphragm 64 is mounted across the chamber 62 and constitutes a partition dividing the interior of the device into the above mentioned negative pressure chamber 62 and a back surface chamber 65, which is communicative with the atmosphere.

A compression return spring 66 is provided in the negative pressure chamber 62 and is adapted to impart return force to the diaphragm 64. An adjusting spring 67 is disposed within the back surface chamber 65 in contact at one end with the back surface of the diaphragm 64 and is adjustably compressed by an adjusting screw 68. The diaphragm 64 is connected at its center to the stem of a valve 69 provided in a passage $S_1$ and normally closed against a valve seat 70 by the force of the return spring 66 to close the passage $S_1$.

The passage $S_1$ corresponds to the branch fitting 48 communicating with the suction pipe 40 of the pump device illustrated in FIG. 9 (the passage $S_1$ in this case being indicated by passage $S_{1a}$ shown by intermittent line in FIG. 14) and corresponds also to the lead-out pipe 54 shown in FIGS. 11 and 12 and to passage hole 61 shown in FIG. 13. That is, this valve 69 is inserted at some point in the path of the pilot gas supplied to passage hole 30 (or 61).

While negative pressure is produced in the intake passageway 31 at each induction action of the engine, this negative pressure is negatively high when the throttle opening is small and increases with the rotational speed of the engine. This negative pressure, which is of pulsive character in accordance with the engine induction action, becomes, in the negative pressure chamber 62, a negative pressure which has been smoothed by the aforementioned constricted part of the passage 63.

When this negative pressure negatively increases to a value below a standard value adjustably predetermined by the adjusting spring 67, the diaphragm 64 is deflected toward the negative pressure side and opens the valve 69. Thus, when the negative pressure within the engine induction passageway is negatively high, the pilot gas supply path is opened, and pilot gas is supplied as described hereinbefore.

The conditions under which the passage $S_1$ is opened correspond to the region below curve (I) (full line) indicated in FIG. 17 and can be caused to coincide with the aforementioned uncertain combustion and non-combustion regions. That is, the uncertain combustion and non-combustion regions are caused by low induction flowrates of the engine, but since the engine induction flowrate and the negative pressure within the induction passageway are interrelated, the supply of pilot gas under conditions corresponding to these regions is cut off thereby to eliminate waste.

While the diaphragm 64 and the valve 69 are mechanically and directly connected in the above described example, it will be apparent that, instead, a combination of a switch actuated by the diaphragms and an electromagnetic valve can be used.

Figure 15:
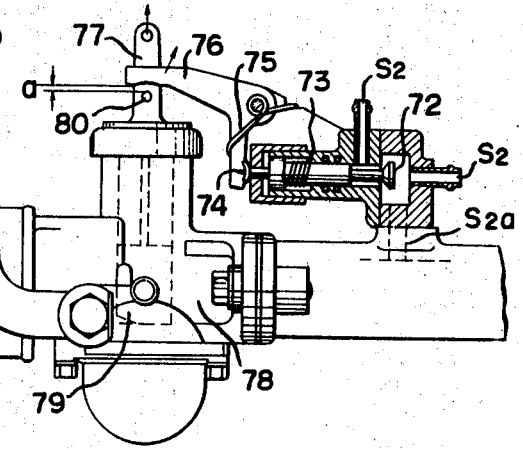
FIG. 15 is a side view of the valve shown in FIG. 14 adapted to be controlled by the degree of throttle opening.

The supply of pilot gas to the spark plug 16 can be controlled also by the degree of throttle opening, as illustrated by one example shown in FIG. 15. In the device shown, passage $S_2$ ($S_{2a}$) is similar to passage $S_1$ ($S_{1a}$) described above and is opened and closed by a valve 72, which is urged toward its valve seat by the force of a spring 73. This force of the spring 73 can be overcome to open the valve 72 by a greater force of another spring 75 applied to the stem of the valve 72 through a pressing member 74, which is engaged by a release lever 76. When this release lever is rotated in the arrow direction, the pressing member 74 is drawn away from the stem of the valve 72, whereby the valve 72 is forced by the spring 73 to close passage $S_2$.

The end of the driven arm of the release lever 76 can be thus rotated by an engagement lug 80 fixed to a control member 77 connected to the throttle valve 79 of the engine carburetor 78, the control member 77 being linked to a control device such as, for example, an accelerator (not shown) and being movable interrelatedly with the degree of opening of the throttle valve 9. When the control member 77 is moved in the arrow directly, the throttle valve opening increases. Thus, the direction of movement of the control member 77 for increasing the throttle opening coincides with the direction for release of the release lever 76.

A small gap, $a$, is provided between the driven end of the release lever 76 and the engagement lug 80 in the closed throttle position. Then, as the throttle is opened, and its degree of opening reaches a predetermined value, the lug 80 engages the driven end of the release lever. When the throttle is opened further, the release lever is force to rotate in the arrow direction, and the valve 72 thereby closes the pasage $S_2$, thereby cutting off the supply of pilot gas.

The specific value of the throttle opening below which the pasage $S_2$ is opened to supply pilot gas is set by appropriately selecting the gap $a$ between the driven end of the release lever 76 and the engagement lug 80. This boundary line is represented by line (II) (intermittent line) in FIG. 17 and can be caused to coincide almost exactly with the boundary between the combustion region and the uncertain combustion and non-combustion regions. In this case, also, a combination of a switch actuated in relation to the throttle opening and an electromagnetic valve can be used instead of the mechanical mechanism described above and illustrated in FIG. 15.

Figure 16:
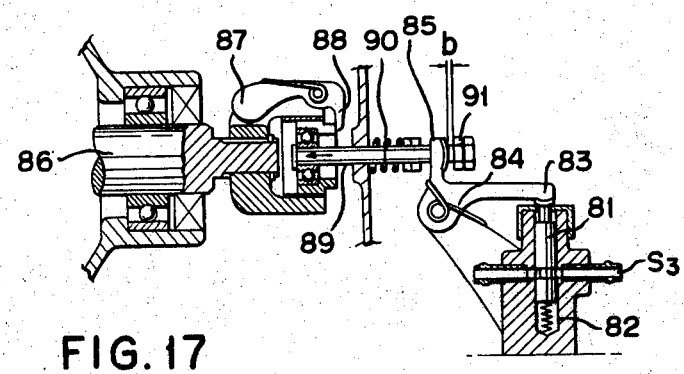
FIG. 16 is a fragmentary view, partly in section, showing the valve shown in FIG. 14 adapted to be controlled by centrifugal force.

In still another simple and convenient example of means for controlling the pilot gas as illustrated in FIG. 16, the organization of a passage $S_3$, a valve 81, a spring 82 for urging the valve 81 toward its closure state, a pressing member 83 for pushing the valve open counter to the force of spring 82, a spring 84 for applying this counter force to the member 83, a release lever 85, and other related parts is similar to that of respectively equivalent parts of the device illustrated in FIG. 15.

In this device, however, the driven end of the release lever 85 confronts and is engageable with an engagement member 91 fixed to one end of an actuating rod 89, which can be actuated in the axial direction indicated by an arrow by the actuating pawl arm 88 of at least one centrifugal weight lever 87 movable by centrifugal force. The centrifugal weight lever 87 is pivoted on a shaft 86 rotating with a specific relationship to the rotation of the engine crankshaft. The driving end of the release lever 85 normally confronts the engagement member 91 with a gap $b$ therebetween. A return spring 90 applies a force on the actuating rod 89 in the direction opposite to that of the arrow.

As the rotational speed of the shaft 86 increases, the centrifugal force acting on the centrifugal weigh lever 87 increases, whereby the pawl arm 88 of the lever 87 moves the actuating rod 89 in the arrow direction counter to force of the spring 90. Consequently, the engagement member 91 engages the driven end of the release lever 85. A further increase in the speed of the shaft 86 causes the actuating rod 89 to move further in the arrow direction, whereby the release lever 85 releases the pushing member 83 away from the valve 81. The valve 81 is thereupon moved by the spring 82 to close the passage $S_3$ and thereby to shut off the supply of pilot gas.

The boundary or critical speed of the shaft 86 at which the above described operation is initiated can be set by appropriately adjusting variables such as the gap $b$. One example of such a setting is indicated by line (III) (vertical dot-and-dash line) in FIG. 17. While the modality or aspect of this method and device is completely different from those in the preceding two examples, this control device is simple and convenient to utilize, considering the frequency with which the various operational conditions of the engine occur, and moreover, is substantially effective in practice.

That is, for example, in the case of a motor vehicle, it is possible for a condition of high engine speed with a small throttle opening to occur, in which condition pilot gas is not supplied, and the exhaust gas is not cleaned. This condition, however, is that of applying a high braking effect through so-called "engine braking" and is a very rare condition, being almost nonexistent except when the vehicle is descending a steep incline at high speed. On the other hand, the frequency of the condition of the large throttle opening and low engine speed, which causes pilot gas to be supplied, is also low. As a result, fuel waste is small.

The range of most frequently occurring conditions is indicated in FIG. 17 by curve (IV) (two dots-and-dash curve) which traces the driving resistance curve of a motor vehicle. From these curves, it is apparent the range of fuel-air gas waste and no cleaning of the exhaust gas can be held to a minimum limit and that this simple control device is amply effective in economically controlling the pilot gas supply.

In this case, also, a combination of a switch and an electromagnetic valve can be used alternatively to operate cooperatively with a mechanism for generating centrifugal force. In such a case, a saving in installation cost can be realized by utilization of existing mechanisms such as the centrifugal governor commonly used in the advance angle mechanism of the distributor.

The present invention, in still another aspect thereof, provides a spark plug 16 of a unique organization, as described below, for effective operation in the engine exhaust outlet passageway to cause combustion of charge-loss gas in a secondary manner by supplying pilot gas according to the invention as described above.

In each of the example of spark plugs 16 as illustrated in FIGS. 19 through 22, there are provided an anode 92 having an extended tip and a cathode 93 surrounding the anode 92 and having a constricted tip 94 disposed coaxially around and in close proximity to the tip of the anode 92 with a spark gap 23 therebetween. An annular chamber 95 is thus formed in the inner part of the cathode 93. Similarly as in a conventional spark plug, the cathode structure has external threads 96 for installation and a part 97 in the shape of a hexagonal bolt head for tightening and loosening the spark plug assembly. A plurality of inlet holes 98 are formed in the cathode wall from the outside thereof into the annular chamber 95, the axes of these inlet holes 98 all being inclined by the same angle and direction relative diametrical directions.

The spark plug 16 is installed by screwing its threads 96 into a tapped hole 99 provided in the upper wall of the exhaust outlet passageway as shown in FIG. 13 and having an annular groove 100 which becomes aligned and communicative with the inlet holes 98 when the spark plug 16 is thus installed, and with which the outlet end of the aforementioned passage hole 30 or 61 communicates. The pilot gas, supplied through the passage hole 30 or 61 as described hereinbefore, passes through this annular groove 100 and inlet holes 98 and enters the annular chamber 95 in directions determined by the askew inlet holes 98. A rotational or swirling motion is thereby imparted to the pilot gas as it descends and flows through and past the spark gap 23 to enter the exhaust outlet passageway. By this organization and operation, the pilot gas it not scattered even when supplied in a small amount and can be conducted positively to the spark gap. Therefore, there is no ignition delay, and, at the same time, a saving in the quantity of pilot gas used can be realized.

Furthermore, since this spark plug 16 is so constructed and installed that its spark gap 23 is disposed in a narrow outlet of a bottle-shaped recess formed in the exhaust outlet passageway, the interior of the chamber 95 is merely subjected to a slight negative pressure and is not otherwise affected by violent gas flow such as that of the exhaust gas which passes through the exhaust outlet passageway. Accordingly, pilot gas can be supplied during the exhaust stroke of the engine without adverse effect. Therefore, the above described organization and installation of the spark plug 16 has the additional advantage of making possible the supplying of pilot gas by any of the aforedescribed devices in a relatively leisurely manner within a wide range of crank advance angles, whereby the control setting of the pilot gas supply device is not critically restrictive.

The above described spark plug 16 in installed state has the additional effect of facilitating the interception of charge-loss gas by the spark gap when pilot gas is not supplied. That is, since the charge-loss gas is present in the exhaust outlet passageway immediately and consecutively after the completion of flow of the exhaust gas, the interior of the chamber 95 of the spark plug 16 is under a slight negative pressure due to the exhaust gas flow, and this negative pressure has the effect of drawing in charge-loss gas when this pressure returns to an equilibrium state. Consequently, charge-loss gas is caused to be present with good timing in the spark gap and immediately neighboring region.

In a modification as illustrated in FIG. 21 of the above described spark plug, a plurality of cutouts 101 are provided around the rim of the tip 94 of the cathode 93, whereby the annular spark gap 23 is divided. This provision is advantageous in that it facilitates sparking and correction of any eccentricity of the anode and, moreover, imparts a cooling effect.

Figure 23:
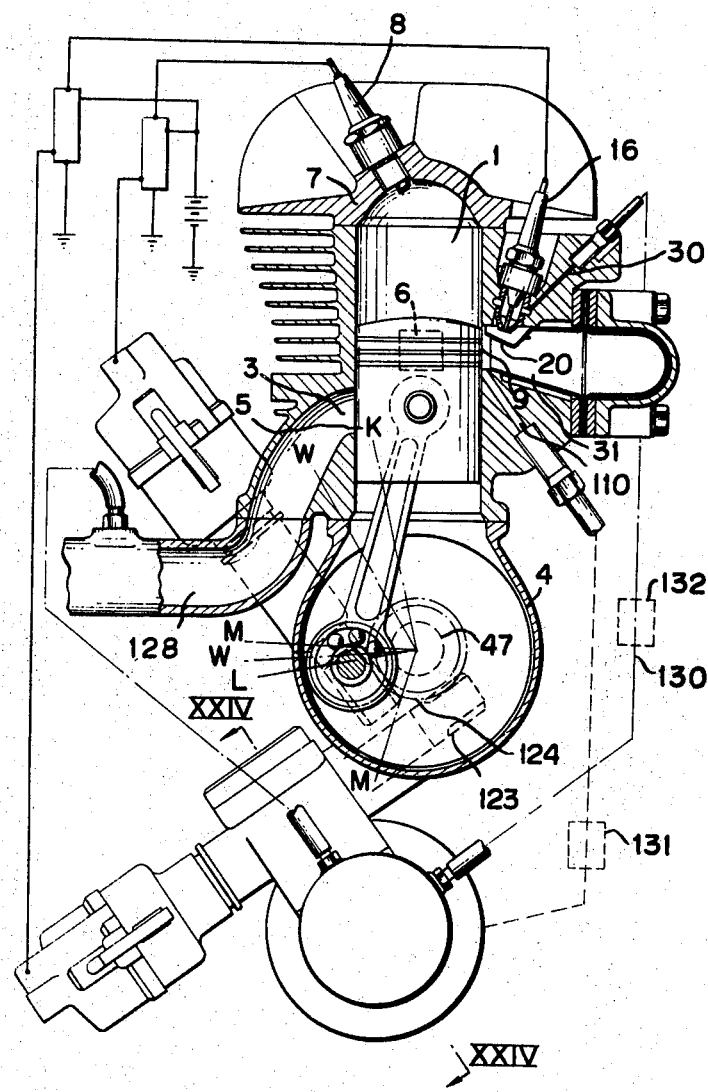
FIG. 23 is a combination of views similar to FIG. 2 showing a further embodiment of the invention as applied to a two-cycle engine.

In a further embodiment of the invention as illustrated in FIGS. 23 and 24, air is supplementarily supplied to the aforedescribed charge-loss gas to assure, further, complete combustion of the fuel therein thereby to clean the exhaust gas. While the charge-loss gas is fuel-air gas itself and will ignite and burn in its expelled state, the oxygen for causing combustion of this gas at normal pressure cannot always be said to be sufficient in all cases since the fuel-air ratio, in general, is of the order of 1/15 for satisfactory performance of the engine in which factors such as the flame combustion speed are required conditions. While such combustion of the charge-loss gas will reduce the hydrocarbon content, carbon monoxide will increase.

Furthermore, a portion of the charge-loss gas which has become mixed with combustion gas becomes a portion which burns incompletely or does not burn at all. If air is supplementarily supplied, the oxygen quantity will become ample, and the formation of hydrocarbons and carbon monoxide will be suppressed, whereby cleaning (combustion oxidation) of the exhaust gas can be accomplished with further thoroughness.

As described hereinbefore, the charge-loss gas is intercepted, ignited, and burned within a very short time while it is still in an undiffused state in the exhaust outlet passageway. Therefore, merely supplying air merely results in a diffusion of this charge-loss gas, and ignition thereof becomes impossible. According to the present invention, air is supplementarily supplied without scattering the charge-loss gas thereby to cause complete combuston of the charge-loss gas.

In one practical example of this embodiment of the invention as illustrated in FIG. 23, there is provided an air supply passage hole 110 with an outlet opening in the exhaust outlet passageway 31 immediately down-stream from the exhaust port 9. Approximately 20 cc. of air is supplied through this air supply hole 110 in conformance with the following conditions. The first condition is that the air be supplied, at the earliest, simultaneously with the sparking of the spark plug 16 or thereafter. The second condition is that this air supplying operation be carried out intermittently for each instance of exhaust by the engine. That is, the air is supplied intermittently once every one revolution of the crankshaft in a two-cycle engine and once every two revolutions of the crankshaft in a four-cycle engine (the air being supplied within the interval corresponding to the crank angle W—W in FIG. 23).

Thus, the air supply is introduced during or after the combustion of the charge-loss gas. During this combustion and oxidation reaction, the introduction of air, of course, assists this reaction, but even when the air is supplied after the completion of the combustion reaction, the hydrocarbons and carbon monoxide formed by incomplete combustion are caused by the heat produced by the combustion to undergo reaction and are oxidized. It is thus possible to convert the charge-loss gas fully into harmless water and carbon dioxide and to cause oxidation to some extent of both hydrocarbons and carbon monoxide within the combustion gas other than the charge-loss gas.

Since supplying of this supplementary air is avoided at the time when the charge-loss gas is blown toward the exhaust outlet passageway, that is, in the interval from the opening of the scavenging port to the closure of the exhaust port and sparking of the spark plug 16, there is no adverse effect such that the charge-loss gas is agitated by the supply of air, so that the performance of the exhaust gas cleaning operation wherein the spark plug spark intercepts the charge-loss gas to cause ignition and combustion thereof is not affected at all.

The above described supplying of supplementary air can be accomplished by means of a pump, one example of which is illustrated in FIG. 24. This pump is essentially a diaphragm pump having a pump chamber 111 containing a diaphragm piston 112 actuated by a piston rod 113, an intake valve 116, and a discharge valve 117. The intake valve 116 communicates with the outside atmosphere, while the discharge valve 117 is communicatively connected by way of an air supply pipe 118 to the aforedescribed air supply passage hole 110.

The piston rod 113 is linked by a connecting rod 115 to a small crank 114, one revolution of which causes one reciprocating cycle of push-pull movement of the piston rod 113. Consequently, the diaphragm piston 112 undergoes one cyclic reciprocating movement thereby to accomplish pumping action by expanding and contracting the volume within the pump chamber 111.

The small crank 114 is coupled by way of gears 119, 120, 121, and 122 to the aforementioned distributor cam shaft 29, which is intercoupled by way of gears 123 and 124 to the engine crankshaft 47 as shown in FIG. 23. That is, the diaphragm piston 112 is driven by the engine crankshaft with an interlinking speed ratio such that one revolution of the crankshaft produces one cyclic reciprocation of the diaphragm piston 112, whereby supplementary air is sent though the air supply passage hole 110 once for every one revolution of the crankshaft.

On the end of the piston rod 113 opposite that of the diaphragm piston 112, there is fixed a diaphragm piston 125 contained within another pump chamber 126, which accomplishes a pumping action similar to that of the pump chamber 111. The pump chamber 126 is provided with an intake valve 127 communicating with the engine intake passageway 128 (as shown in FIG. 23) and a discharge valve 129 communicating through a pilot gas supply pipe 130 to the aforedescribed pilot gas supply passage hole 30 (or 61). Thus, fuel-air gas is delivered as pilot gas through the passage hole 30 (or 61) once for every one revolution of the crankshaft.

It will be evident that the spaces on the reverse sides of the diaphragm pistons 112 and 125 can also be formed as pump chambers 111a and 126a and provided with respective intake valves and discharge valves to form additional pumps. It is possible to combine these pump chambers 111, 111a, 126, and 126a and selectively cause the supplies of air and pilot gas to be of the same phase or of opposite phase by 180 degrees of angle during one revolution of the crankshaft.

In actual practice, the phases and angular range become the same phase or opposite phases as indicated by the aforementioned angular ranges M—M and W—W and do not always become the same angular range. However, by appropriately selecting the inner diameters and lengths of the air supply pipe 118 and pilot gas supply pipe 130 (and installing chambers 131 and 132 at intermediate points thereof in some cases), it is possible to cause the timings and supply angular ranges of the supply to the exhaust outlet passageway and the spark gap to coincide with the specified angular ranges M—M and W—W.

Accordingly, by adapting the air supply pump which is constructed as a duplex pump, it is possible to provide parallelly a pump for pilot gas supply and thereby to afford positive combustion of the charge-loss gas by supplying of pilot gas without installing, especially, a separate pump.

In the preceding embodiments of the invention for two-cycle engines, charge-loss gas is burned within the exhaust outlet passageway. Consequently, a part of the engine cylinder is directly heated, and the cylinder temperature is thereby raised unless a countermeasure is provided. A rise in the cylinder temperature gives rise to the risk of engine failure of malfunctioning such as seizure of moving parts, thermal deformation of parts, and breaking of the oil film on the cylinder wall. In the case of a four-cycle engine, there is the risk of overheating of valves and valve seats. The present invention, is still another aspect thereof, overcomes this problem by providing an insulated construction of the exhaust outlet passageway whereby the heat of combustion of the charge-loss gas is prevented from being transmitted to the engine cylinder.

Figure 25:
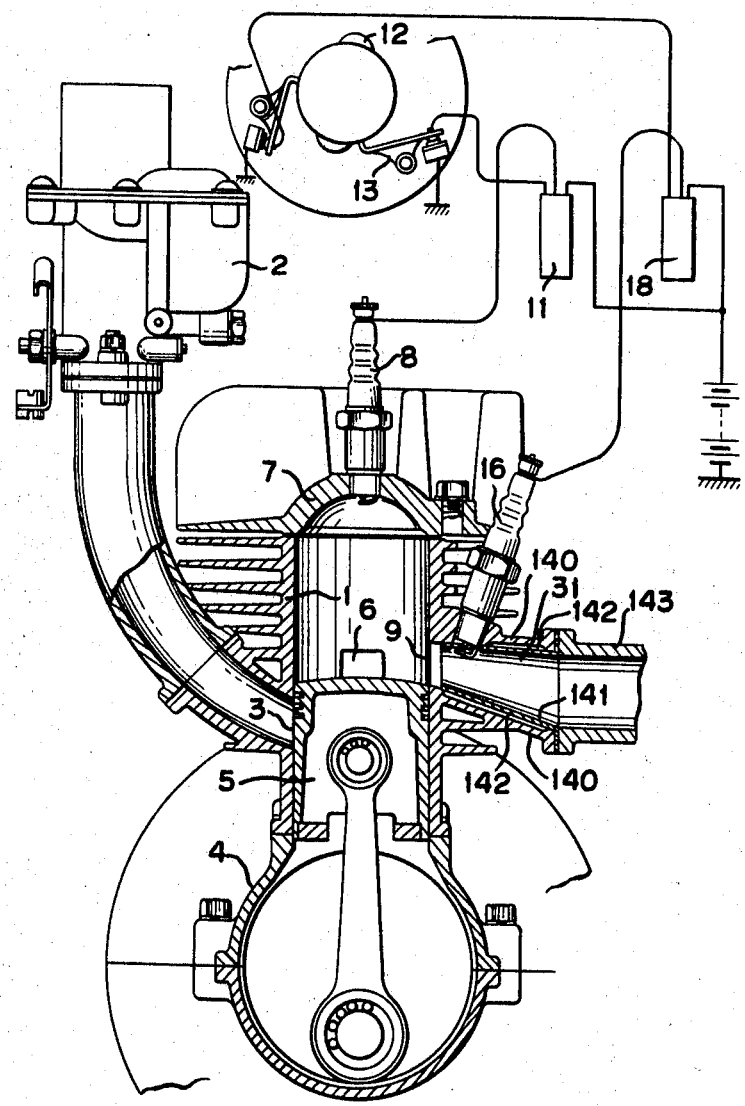
FIG. 25 is a combination of views similar to FIG. 2 showing an additional embodiment of the invention provided with heat barrier device.

In one example of such construction as illustrated in FIG. 25, the inner wall surface of the exhaust outlet passageway 31 is gouged out in the radial or transverse direction except at the ends to form a hollow 140 whereby the passageway 31 is widened in that direction, and a hollow cylindrical or funnel-like structure 141 made of a metal of low thermal conductivity is fitted into the passageway 31, the inner surface of the structure 141 thereby constituting the inner wall surface of the passageway.

The hollow 140 between the structure 141 and the gouged-out wall of the passageway may be left empty or may be filled with a heat insulation material such as asbestos. The discharge end of the passageway 31 is connected to the inlet end of an exhaust pipe 143 which is connected further downstream to a muffler (not shown).

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. In an internal combustion engine having at least one cylinder with a closeable exhaust port communicating contiguously with an exhaust outlet passageway, into which some fuel-air gas is blown and escapes as charge-loss gas prior to full closure of said exhaust port, an exhaust gas cleaning device comprising an ignition spark plug having a spark gap disposed in said passageway immediately downstream from the exhaust port, ignition means to cause said spark plug to spark immediately after full closure of the exhaust port, and pilot gas supply means to supply a small quantity of fuel-air gas as pilot gas directly to said spark gap to be ignited thereby and burn to generate an inductive flame for causing secondary ignition and combustion of said charge-loss gas.

2. The exhaust gas cleaning device as claimed in claim 1 in which the pilot gas supply means comprises, in combination, a pilot gas supply passage having an outlet disposed in close proximity to said spark gap of the spark plug and a gas pump operating interrelatedly with a principal moving part of the engine to draw fuel-air gas from a fuel-air intake passageway of the engine and to deliver said gas as pilot gas to the pilot gas supply passage.

3. The exhaust gas cleaning device as claimed in claim 1 in which the pilot gas supply means comprises, in combination, a pilot gas supply passage having an outlet disposed in close proximity to said spark gap of the spark plug and a gas pump operating interrelatedly with a principal moving part of the engine to draw fuel-air gas from a carburetor independent of the engine and to deliver said gas as pilot gas to the pilot gas supply passage.

4. In a two-stroke-cycle engine having a crankcase into which fuel-air gas is drawn and then compressed and at least one cylinder with a closeable exhaust port, communicating contiguously with an exhaust outlet passageway, into which some fuel-air gas is blown and escapes as charge-loss gas prior to full closure of said exhaust port, an exhaust gas cleaning device comprising, in combination, an ignition spark plug having a spark gap disposed in said passageway immediately downstream from the exhaust port, ignition means to cause said spark plug to spark immediately after full closure of the exhaust port, and pilot gas supply means for supplying a small quantity of said fuel-air gas compressed in said crankcase as pilot gas directly to said spark gap to be ignited thereby and burn to generate an inductive flame for causing secondary ignition and combustion of said charge-loss gas.

5. In a two-stroke-cycle engine having at least one piston and a corresponding cylinder with a closeable exhaust port communicating contiguously with an exhaust outlet passageway, into which some fuel-air gas is blown and escapes as charge-loss gas prior to full closure of said exhaust port, an exhaust gas cleaning device comprising, in combination, an ignition spark plug having a spark gap disposed in said passageway immediately down-stream from the exhaust port, ignition means to cause said spark plug to spark immediately after full closure of the exhaust port, and a pilot gas supply passage having an outlet in close proximity to said spark gap and an inlet opening in the inner wall surface of the engine cylinder immediately above the exhaust port and operating during the compression stroke of the piston to conduct a small quantity of fuel-air gas as pilot gas from the cylinder interior to the spark gap to be ignited thereby and burn to generate an inductive flame for causing secondary ignition and combustion of said charge-loss gas.

6. The exhaust gas cleaning device as claimed in claim 1 in which the pilot gas supply means comprises a pilot gas supply passage having an outlet in close proximity to the spark gap, delivery means to deliver fuel-air gas as pilot gas to the inlet of said passage, and control means interposed between said delivery means and said passage and operating in response to negative pressure within a fuel-air intake passageway of the engine to permit a small quantity of said pilot gas to be delivered to the pilot gas supply passage only when said negative pressure negatively exceeds a predetermined value.

7. The exhaust gas cleaning device as claimed in claim 1 in which the pilot gas supply means comprises a pilot gas supply passage having an outlet in close proximity to the spark gap, delivery means to deliver fuel-air gas as pilot gas supply passage only when said throtttle opening si terposed between said delivery means and said passage and operating in response to the degree of throttle opening of a corresponding carburetor of the engine to permit a small quantity of said pilot gas to be thus delivered to the pilot gas supply passage only when said throttle opening is smaller than a predetermined degree.

8. The exhaust gas cleaning device as claimed in claim 1 in which the pilot gas supply means comprises a pilot gas supply passage having an outlet in close proximity to the spark gap, delivery means to deliver fuel-air gas as pilot gas to the inlet of said passage, and control means interposed between said delivery means and said passage and operating in response to the speed of a principal moving part of the engine to permit a small quantity of said pilot gas to be thus delivered to said passage only when the engine speed is lower than a predetermined speed.

9. In an internal combustion engine having at least one cylinder with a closeable exhaust port communicating contiguously with an exhaust outlet passageway, an exhaust gas cleaning device comprising, in combination: an ignition spark plug having a spark gap disposed in said passageway immediately downstream from the exhaust port; a pilot gas supply passage having an outlet in the proximity of said spark gap; an air supply passage having an outlet in the proximity of the spark gap; a duplex pump consisting of first and second diaphragm pumps and driven by the engine interrelatedly therewith; and ignition means to cause the spark plug to spark after the exhaust port is closed during each cycle of the engine operation, said first diaphragm pump operating to supply a small quantity of fuel-air gas as pilot gas through the pilot gas supply passage to the spark plug immediately before the spark plug thus sparks, and said second diaphragm pump operating to supply air through the air supply passage into the exhaust gas passageway after the spark plug sparks.

References Cited
UNITED STATES PATENTS

| | | | |
|---|---|---|---|
| 2,005,249 | 6/1935 | Tietig | 60—30 |
| 2,806,346 | 9/1957 | Clayton | 60—30 |
| 2,864,960 | 12/1958 | Von Linde | 60—30 |
| 3,203,168 | 8/1965 | Thomas | 60—30 |
| 3,263,412 | 8/1966 | Thompson | 60—30 |
| 3,360,927 | 1/1968 | Cornelius | 60—30 |

DOUGLAS HART, Primary Examiner

UNITED STATES PATENT OFFICE
CERTIFICATE OF CORRECTION

Patent No. 3,559,401      Dated February 2nd, 1971

Inventor(s) SATORU TAKAHASHI

It is certified that error appears in the above-identified patent and that said Letters Patent are hereby corrected as shown below:

Column 17, lines 3 and 4, delete "supply passage only when said throttle opening si terposed" and insert in lieu thereof -- to the inlet of said passage, and control means interposed --.

Signed and sealed this 20th day of July 1971.

(SEAL)
Attest:

EDWARD M. FLETCHER, JR.
Attesting Officer

WILLIAM E. SCHUYLER, JR.
Commissioner of Patents